A. M. HALL.

Mower.

No. 1,210. Reissued July 9, 1861.

Witnesses
[illegible]
[illegible]

Inventor
Andrew M. Hall
By
Thomas H. Dodge

N. PETERS, Photo-Lithographer, Washington, D. C.

UNITED STATES PATENT OFFICE.

ANDREW M. HALL, OF WEST FALMOUTH, MAINE, ASSIGNOR TO JAMES A. SAXTON, OF CANTON, OHIO.

IMPROVEMENT IN MOWING-MACHINES.

Specification forming part of Letters Patent No. 16,274, dated December 23, 1856; Reissue No. 1,210, dated July 9, 1861.

*To all whom it may concern:*

Be it known that I, ANDREW M. HALL, of West Falmouth, in the county of Cumberland and State of Maine, have invented certain new and useful Improvements in Mowing-Machines; and I do hereby declare the following to be a full, clear, and exact description of the same, reference being had to the accompanying drawings, which form a part of this specification, and in which—

Figure 1:
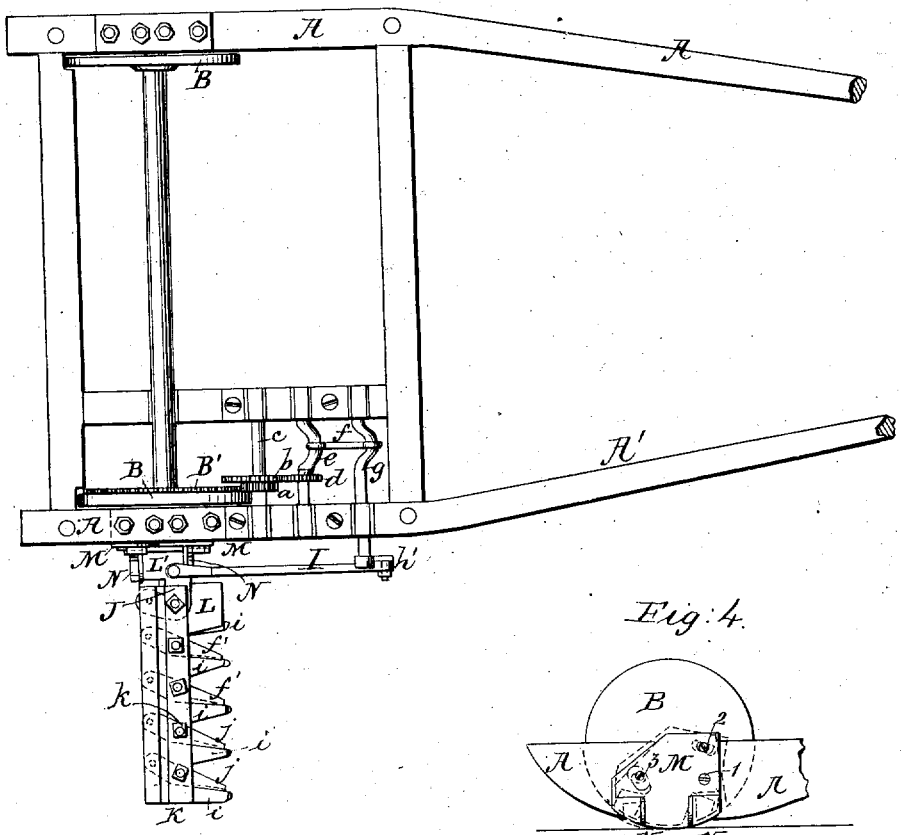
Figure 4:
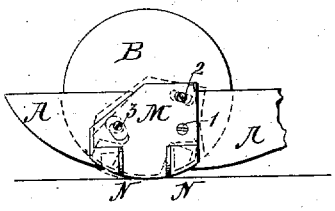
Figure 2:
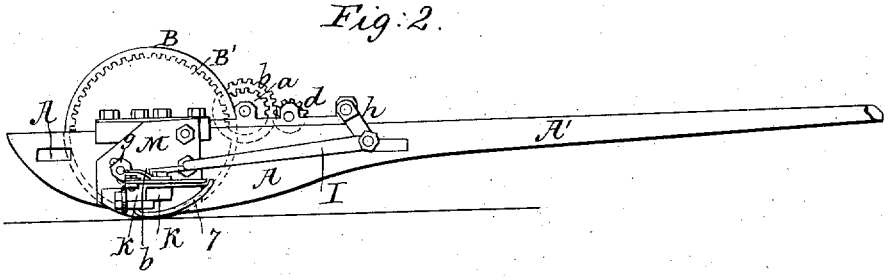
Figure 3:
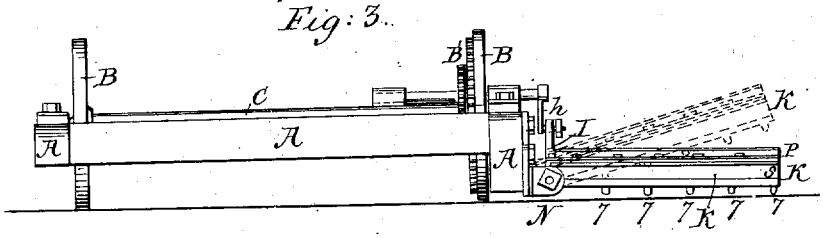

Figure 1 represents a plan view of my improvements. Fig. 2 represents a side view looking in the direction of arrow 1, Fig. 1. Fig. 3 represents a rear view, the finger-beam being shown in red lines elevated at its outer end; and Fig. 4 represents a side view of the adjusting-plate M, together with certain other portions of the machine, the plate M being shown in different positions by black, blue, and red lines.

In the drawings, A represents the main frame, the extension side pieces, A′, answering the purpose of thills by which to guide and steady the machine, the draft connections being of any known form. B B are the main supporting and driving wheels, fast to the axle C. B is a gear, fast to the main wheel next to the cutting apparatus, and gears with wheel *a* fast on shaft *c*, and to which gear *b* is also made fast, whereby, as gear *b* is revolved, gear *d*, together with its crank-shaft *e*, are revolved. Crank-shafts *e* and *g* are connected by a link, *f*, so that as crank *e* is revolved crank *g*, which is greater than *e*, is caused to vibrate back and forth, thus giving a similar vibration to the crank *h′*, to whose wrist the front end of the pitman or connecting rod I is attached. In this way the bent lever J, which is pivoted to the heel of the finger beam, is caused to vibrate on its fulcrum, causing the cutter bar or bars 5 6, between which the rear ends of the cutters are pivoted, to move back and forth, whereby the front of the cutters, which are pivoted to the finger-beam at *k*, is caused to vibrate back and forth between fingers or stationary cutters *i* far enough to cut on each side, first on one side and then on the other. The cutters are pivoted to the upper side of the finger-beam K, and work over the edges of the fingers or stationary cutters *i*, which are provided with curved supports 7, as shown in the drawings, the rear ends of the supporters 7 being made fast in the bottom of the finger-beam K. The top of the finger-beam is formed with a depression, K′, for the purpose of allowing the cutter-bar to work down low enough to permit the cutters to rest on the face of the stationary knives or fingers, which are fastened to the top of the finger-beam. By this construction and arrangement of parts the cutting apparatus is rendered quite compact and well protected from injury. A cap, *l*, is placed over the rear of the cutters to keep out cut grass. The finger-beam is formed of metal, and its heel is provided with an eye, whereby to hinge it between ears N N, which project from the side of an adjusting-plate, M. The main part of the adjusting-plate M is made in the form shown in the drawings, and hung to the side of the main frame by a hinge or bolt, 1, so that its ears N N, which support the heel of the finger-beam, will be close down to the ground. Plate M can be adjusted back and forth, as shown in different colors in Fig. 4. If allowed to swing on the hinge 1, it would adjust itself, or, if desired, by means of the bolts and nuts 2 and 3 it can be held in any desired position to give the points of the guards a greater or less inclination, the plate being cut out for that purpose. This is often of great advantage, especially in mowing on land which is uneven and cut up by furrows, since, if the points of the guards or cutters on such land are left turned down as low as when used on level ground, they are liable to run into elevations of ground instead of running over them. In the use of a finger-beam in a mowing-machine hinged to the grain side of the machine by one of its ends only, so as to be capable of rising and falling as these machines have heretofore been constructed, the finger-beam was arranged on a line back of the axis of the main driving and supporting wheels; consequently it became necessary to employ connections and coupling-pieces of considerable length in order to give the cutting apparatus the necessary freedom of motion when the machine was passing over uneven ground. By my arrangement, however, the finger-beam is so placed that it is nearly on a line with the axis of the supporting-wheel, and consequently the motions of the machine do not affect the position of the cutting apparatus so much as if it were arranged farther back, hence there is not that necessity for long connections, which are more liable to break. By bringing the main frame down close to the ground and giving it the form of a runner it runs over mown grass which may happen to be close to the heel of the finger-beam and presses it down, thus preventing its being rolled up in front of the machine. The connection of the front of the pitman I with its wrist is loose, so as not to cramp when the finger-beam is passing over uneven ground.

Having described one mode of applying my said improvements to practical use, what I claim, and desire to secure by Letters Patent, is—

1. The combination, with the heel of a finger-beam so connected or hinged to the main frame of a mowing-machine as that the entire bar can rise or fall independent of the up-and-down motion of the main frame of a self-adjusting hinged plate or auxiliary shoe, for the purpose of allowing the points of the guards or fingers to freely adapt themselves to the character of the ground over which the machine passes while in operation.

2. I do not claim, broadly, so constructing and connecting the finger-beam to the main frame of a mowing-machine as that the points of the guards can be adjusted up or down, but I claim, in combination with a s lf-adjusting auxiliary shoe or plate, as set forth in the above claim, of an adjusting screw or bolt, for the purposes stated.

3. The combination of the adjustable metallic plate M with its ears N N, and otherwise constructed as described, with the heel of the finger-beam and main frame, as set forth.

4. The combination of the bent lever J and its operating mechanism and hinged oscillating cutters *j* with a hinged finger-beam, for the purposes stated.

In witness whereof I have hereunto subscribed my name.

ANDREW M. HALL.

In presence of—

J. A. P. MERRILL,

A. Y. MERRILL.